April 30, 1935. W. F. HOLLISTER 1,999,458
TREATING METHOD, MEANS, AND COMPOSITION FOR TREES AND THE LIKE
Filed Feb. 12, 1934
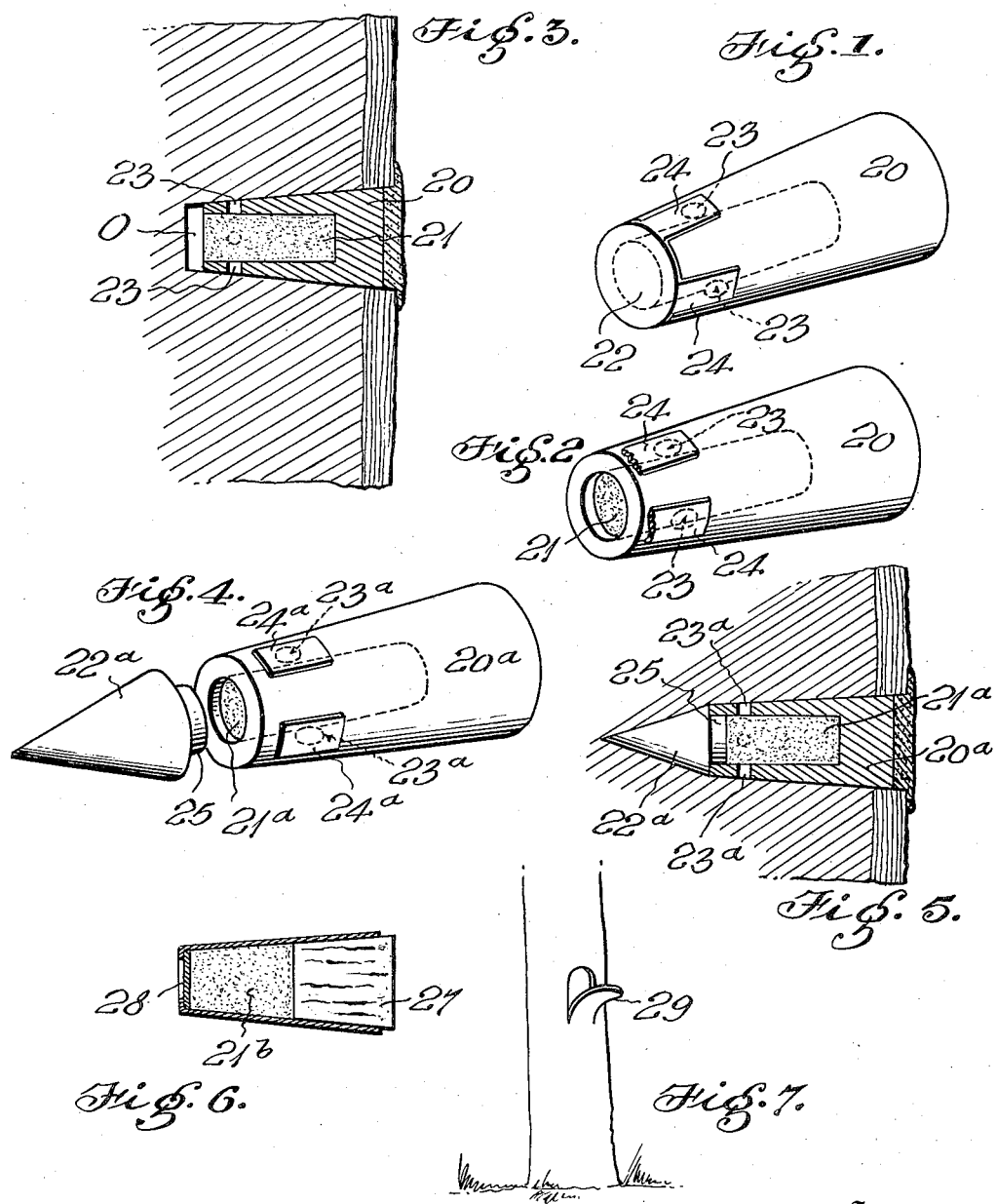
Witness
H. Woodard
Inventor
W. F. Hollister
By H. B. Willson &co.
Attorneys.

Patented Apr. 30, 1935

1,999,458

UNITED STATES PATENT OFFICE 1,999,458

TREATING METHOD, MEANS, AND COMPOSITION FOR TREES AND THE LIKE

Willoughby F. Hollister, Cowen, W. Va.

Application February 12, 1934, Serial No. 710,947

8 Claims. (Cl. 47—1)

The invention aims to provide a new and advantageous method, means and composition for the treatment of trees, shrubs, vines and the like, to cure or fortify against disease, and/or to kill or fortify against insects, etc., and/or to carry out a general tonic effect. The invention is practiced primarily with trees and vines bearing edible fruits and has been found to improve the color, size and taste thereof, but I do not consider the invention as restricted to fruit producers for it is of advantage also in the treatment of trees, vines, shrubs, etc. used for shade and landscape purposes.

Solely for simplification of description, reference will hereinafter be made only to trees, and the term is not to be considered as limiting to trees alone.

With the foregoing in view, the invention resides in the novel subject matter hereinafter described and claimed, description being accomplished by reference to the accompanying drawing.

Fig. 1 is a perspective view showing one form of capsule which may be used for tree treatment in accordance with the present invention.

Fig. 2 is a view similar to Fig. 1 but showing the cover for the inner end of the capsule removed, preparatory to use of the latter.

Fig. 3 is a vertical sectional view showing the capsule driven into an opening in a tree, the outer end of the opening being sealed.

Fig. 4 is a disassembled perspective view showing a modified form of capsule.

Fig. 5 is a view similar to Fig. 3 showing the capsule of Fig. 4 driven into a tree.

Fig. 6 is a longitudinal section showing a third form of capsule.

Fig. 7 is a perspective view illustrating the manner in which a receiving pocket for the treating powder may be formed without actually drilling an opening into the tree.

I have herein disclosed preferred embodiments of the invention and they will be specifically described. However, it is to be understood that within the scope of the invention as claimed, variations may be made.

In Figs. 1 to 3, inclusive, I show a hollow tapered capsule 20 which may be formed from wood or any other desired material. This capsule contains a quantity, preferably about one-half teaspoonful of a hereinafter described treating powder 21. The smaller or inner end of the capsule 20 is open, but a closure 22 is provided for said end, said closure preferably consisting of gummed paper which may easily be removed or broken when the capsule is to be used. The capsule is also formed with a plurality of small passages 23 leading from its interior to its periphery, and film-like closures 24 are provided for the outer ends of said passages, said closures being secured upon the periphery of the capsule and preferably consisting of thin gummed paper. They may, if desired, be integral with the closure 22, as shown, but this is not essential.

In making use of the loaded and sealed capsule above described, a socket is first formed in any desired part of the tree to be treated, the capsule, conditioned to allow the sap to reach its contents is placed in this socket, and said socket is then sealed. However, should it be desired to effect the treatment without using a capsule, the treating powder may be deposited directly into the socket, the latter being then sealed so that rain cannot enter and the powder cannot be blown out. Preferably, a socket O is drilled in the tree as shown in Fig. 3. The cover 22 of the capsule is either removed or broken, and said capsule is then driven tightly into said socket to not only place the treating powder 21 therein, but to tightly plug the open end of the socket. Sealing at the outer end of the plug or capsule may be effected by the use of grafting wax or in any other suitable way, and the tree will soon heal over the seal.

During the driving of the plug or capsule 20, the film-like coverings 24 of the openings 23 are disrupted or worn away by friction against the wall of the socket O. Thus, the passages 23 are opened in addition to having the inner end of the capsule open. The tree sap may thus readily reach the treating powder 21 to dissolve the latter, and the treated sap thus produced, flows through the natural channels to all parts of the tree.

The powder 21 preferably includes both an insecticide and a tonic. Good results are attainable if this powder consists of calomel, sulphur and quinine in equal parts. However, it preferably consists of calomel, sulphur, quinine, iron and arsenic, as follows:—

18/30 calomel (hydrargyri chloridum mild, mild mercurous chloride).
6/30 sulphur (sublimed and flowers of sulphur).
3/30 quinine (sulphate quinine).
2/30 iron (reduced iron).
1/30 arsenic (arsenious acid).

When the powder 21 is compounded according to either of the above described formulæ, it produces excellent results, not only as an insecticide, but as a tonic. There is nothing more deadly to insects and the like which prey upon trees than calomel, and when the latter is placed in the tree sap, it will be carried thereby to every insect or the like preying upon the tree and will kill them in a very short time. Then too, the calomel will fortify against attacks by other insects and the like.

The sulphur, quinine, arsenic and iron are all fine tree tonics tending to ward off disease or to cure the same, and so rejuvenating or maintaining health of the tree as to give more leaf area and prevent defoliation before the fruit is ripe, giving fruit of better commercial size and better flavor. The iron, in addition to being a good tonic, adds materially to the color of the fruit.

Included in diseases which may be checked and/or prevented with the invention, are the well known blights which have heretofore caused the death of great numbers of valuable trees.

I prefer for treating trees up to one inch, ⅛ teaspoonful of the treating composition; one to three inches, ¼ teaspoonful; three to six inches ½ teaspoonful in hole drilled close to the ground; from 6 to 10 inches, a full teaspoonful, half in one capsule and half in another, embedding them in opposite sides of the tree; from ten inches up, 1½ teaspoonfuls distributed equally in three capsules and embedded at points spaced apart around the trunk about 120° apart, at different heights from the ground. These directions are illustrative but may be varied. The depth of the opening O may also be varied, from merely a depth sufficient to receive the capsule in small trees, to several inches for larger trees.

Should it be so desired, any limb of the tree can be treated and after time has been given for the ingredients to be taken up by the sap, the limb can be cut off. However, this is not essential, for any small wounds made in the tree will soon heal.

In Figs. 4 and 5, the capsule 20ª is substantially a duplicate of the capsule 20, being provided with an open front end, with passages 23ª normally closed by films 24ª. The closure 22ª for the capsule however, is in the form of a driving point which bears against the body of the capsule and is provided with a small plug 25 fitting frictionally into the latter. Both the capsule 20ª and the driving point 22ª are formed from metal or other material sufficiently hard to permit driving of the capsule into a tree without first drilling a socket into the latter, should this procedure be desired. During the driving of the capsule, the covering films 24ª are disrupted or worn off, exposing the openings 23ª so that the sap can reach the treating powder 21ª.

The capsule shown in Fig. 6 is intended to be driven into a socket in the same manner as the capsule 20. It consists of a thin thimble 26 containing the treating powder 21ᵇ, said thimble being preferably formed from paper. In the larger end of the thimble, a tapered bottle cork 27 is secured by glue or the like, and the smaller end of the thimble is closed, preferably by gluing it upon the outer side of a paper or cardboard disk 28. Before driving the capsule into the socket in a tree, its smaller end is torn or cut open so that the tree sap may have access to the treating powder 21ᵇ.

In treating very small trees or if it be inconvenient to drill openings or otherwise form sockets in them, a piece of the bark 29 may be cut loose and sprung outwardly as seen in Fig. 7. The powder is then introduced into the pocket thus formed, the bark is forced back into position and is bound in place by cord or the like, grafting wax also being used if desired. By treating the tree in this manner, the only implement required is a knife.

I claim:—

1. A tree treating composition comprising calomel, sulphur and quinine.

2. A tree treating composition comprising calomel, sulphur, quinine, iron and arsenic.

3. A tree treating capsule comprising a tapered hollow plug to be driven into an opening in the tree, and a treating medium in said plug, said plug having a passage from its interior to its periphery to allow the tree sap to reach the treating medium, and a covering film for the outer end of said passage, said film being secured upon the periphery of the plug and being removable by friction with the wall of the opening in the tree when driving the plug.

4. A tree treating capsule comprising an elongated hollow body pointed at one end for driving into a tree, and a tree treating medium in said hollow body, said body having a passage from its interior to its exterior to allow the tree sap to reach the treating medium.

5. A tree treating capsule comprising an elongated hollow body having an open end, a tree treating medium in said hollow body, and a driving point closing said open end of the body to adapt the latter for driving into a tree, said capsule having a passage from its interior to its exterior to allow the tree sap to reach the treating medium.

6. In combination with a tree having a socket which is open only at one side of said tree; a capsule confined in its entirety within said socket and hermetically sealed therein, and a tree-treating substance confined within said capsule, said capsule having provision to allow the tree sap to reach said substance.

7. In combination with a tree having a socket which is open only at one side of said tree; a hollow tapered plug tightly driven into said socket and having its outer end spaced inwardly from the exterior of the tree leaving the outer end of said socket unoccupied by the plug, a plastic seal filling and hermetically sealing said outer end of said socket, and a tree-treating substance within said hollow plug, said plug having provision to allow the tree sap to reach said substance.

8. A capsule for tree treatment comprising a tube to contain a tree treating medium, said tube being longitudinally tapered for driving into an opening drilled in the tree, having a closed inner end and being formed from a material which may be readily perforated before insertion of the tube, and a tapered cork closing the larger end of said tube, said cork being adapted to seal the opening in the tree when the capsule is completely driven.

WILLOUGHBY F. HOLLISTER.